United States Patent Office 3,513,071
Patented May 19, 1970

3,513,071
PROCESS AND COMPOSITION FOR LOOSENING AND REMOVING EDIBLE TISSUE FROM SHELLS OF MARINE CREATURES
Gottlieb Bernhard Fehmerling, P.O. Box 236, Bridgeton, N.J. 08302
No Drawing. Filed May 5, 1967, Ser. No. 636,249
Int. Cl. A22c 29/00
U.S. Cl. 195—2                    13 Claims

ABSTRACT OF THE DISCLOSURE

A method and composition for loosening and then removing the edible tissue from the shells of marine creatures held therein by connective tissue by immersing these creatures in an aqueous bath of enzymes in a concentration of .01–5% by weight, under optional vacuum, the enzymes being in a synergistic mixture 60–96% proteolytic and 4–40% diastatic enzymes by weight of the total present and optionally 1–20% by weight cellulase enzymes for a time, 45–300 minutes and at a temperature of 90° F.–175° F. sufficient to dissolve at least partially said connective tissue to loosen the edible tissue in the shells, then removing the creatures from the bath and spraying the creatures to remove the edible tissue from the shells.

Generally, the present process relates to the discovery of processes and composition for treating marine creatures to obtain edible tissue. More particularly, the present invention is concerned with the method and composition for loosening and removing the edible tissue from the shells of marine creatures through the use of a synergistic mixture of enzymes which attack the connecting tissue between the shell and the edible portion of the marine creature.

In present day practices, for obtaining the edible portions from marine creatures, such as oysters, clams, scallops, shrimp, crayfish, conch and the like, involve a variety of mechanical, electrical and heat treatments which include subjecting the shellfish and/or crustacea to a sawing action on the shells, a high or low electrical voltage through the shells, treatment with direct flame, immersion in boiling water or various chemical treatments, treatment with steam at atmospheric pressure or under high pressures in closed vessels. A myriad of other processes are known which involve combinations of some or all of the foregoing methods.

While some of the processes may experience various degrees of success, most of the prior known processes require hand labor to treat the individual fresh shellfish or crustacea in order to remove the edible flesh. Many processes may adversely effect the flavor, odor or appearance of the fleshy portion to varying degrees while certain other processes result in the sand or other earthy substances which are found in or attached to the shellfish due to the methods used for harvesting the shellfish, becoming imbedded in the edible flesh. Normally, this foreign matter cannot be entirely removed from the flesh and results in low quality products which have substantially reduced consumer appeal.

In view of the lack of any significant success in any processes or composition presently known for the removal of the edible flesh from the shells of crustacea or shellfish, many producers of such products still rely upon the time honored but painfully slow manual operation for treating and cleaning each individual creature.

Individual problems which are associated with the particular type of marine creature must also be given special treatment, for instance shells which are produced from any manual method of shucking retain, to some degree, pieces of flesh attached to the shell and, hence, in a short time, develop an offensive odor due to the actions of microorganisms necessitating these shells being further treated or rapidly discarded to avoid this problem. And, in the case of shrimp, the large intestine often referred to as the vein of the shrimp, must be removed by hand operation to produce a commercial product. This vein removal not only also is again time consuming but frequently results in a loss in edible flesh as it accompanies the discarded vein.

Accordingly, it is the primary object to provide a process and composition which facilitates the loosening and removal of the edible flesh from marine creatures.

Another object of the present invention is the provision of a process and composition which substantially eliminates the need for manual operations that may tend to contaminate the flesh with pathogenic microorganisms which produce health hazards to the consumer or which cause a product deterioration through flavor or odors.

A further object of the present invention is to eliminate the operations which cause foreign materials such as sand and earthy matter to be formed into the tissues of the edible flesh.

This invention has a further object of providing a method and composition which attacks and at least partially dissolves or weakens the connective tissue between the shells of the marine creatures and the edible flesh.

A further and important object of the present invention is the provision of a synergistic mixture of enzymes which attack and hydrolyze selected portions of the connected tissue holding the edible flesh in the shells.

As a still further object of the present invention, the provision of a synergistic bath of enzymes which hydrolyzes the chitin of the shells to effect the loosening of the edible flesh in the shell.

Another object of this invention is the simple removal of the vein or large intestine of the shrimp.

A further object of the present invention is the provision of water spray for removing the edible flesh from the shells after they have been immersed in the enzyme bath.

These and other objects of the present invention will become more apparent after a careful study of the following specification and claims.

Generally, the present invention is a discovery of the composition and method for the treatment of marine creatures which includes a synergistic combination of enzymes that attack the connective tissue holding the edible flesh to the shell.

The connecting tissue between the edible flesh and the shell of shellfish, such as clams, is composed, at least in part, of proteinaceous compounds which include collagen and form a narrow layer of cells between the shell and the true muscles of the shellfish. In the clam, the edible flesh includes the gills, the tongue and the adductor muscles but should not include the belly which is normally attached to the tongue. The foregoing nomenclature is that of common usage and while not technically accurate, will be clearly understood to all those skilled in the art as identifying particular parts of the shellfish. The hinge has also been considered in the present invention since this small but important portion of the shellfish at least partially controls the opening of the shell halves. The exact chemical composition or makeup of the hinge and the connective tissue between the shell and the edible portions of the shellfish or, for that matter, the connecting tissue in any of the marine creatures, has not been determined due to the complexity of the tissue involved, but is found to be composed of materials which will hydrolyze in the presence of selected enzymes.

Since at least a portion of the connecting tissue includes proteinaceous matter, it was naturally believed that proteolytic enzymes could alone be utilized to convert the proteins to less complex compounds, amongst which may be included amino acids and peptides. However, the proteolytic enzymes were found to be wanting in desirable effect due to the complexities of the connecting tissue. It was then discovered that the action of the proteolytic enzymes would be synergistically improved in addition to which, other portions of the connecting tissue would be hydrolyzed effecting a substantial loosening of the edible flesh in the shell if the proteolytic enzymes were combined with diastatic enzymes. It is believed that the diasatic enzymes attack the polysaccharides such as chitin or starch into less complex compounds such as dextrin or dextrose.

The synergistic combination of proteolytic enzymes with diastatic enzymes has been further found to be particularly effective when used with crustacea such as shrimp. Shrimp, like other crustacea, have a shell chemically unlike the shell of the shellfish such as the clam or oyster in that the shrimp shell is composed of substantial amounts of chitin and it has been found that the diastatic enzymes hydrolyze the chitin readily so as to substantially loosen the edible portion of the shrimp. At the same time, the effect of the proteolytic enzymes upon the protein of the shell of the shrimp is enhanced to effect a complete breakdown of the shell to expose the edible flesh.

While the enzymes found to be of critical importance to the present invention are in the synergistic combination of proteolytic and diastatic enzymes, it has also been found that an optional third type of enzyme may be used to convert the cellulose in the connecting tissue in the shellfish and the shell and connecting tissue in the crustacea into lower molecular weight saccharides. These cellulose attacking enzymes are referred to as cellulase. The cellulase enzymes are particularly effective upon the chitin and soften and partially dissolve the chitin more rapidly and more completely than the use of the proteolytic and diastatic enzymes in combination.

It is believed, though not certain, that in operation the three classes of enzymes may operate in a manner so that the cellulose structure of the cell and connecting tissue of the marine creature is attacked by the cellulase to produce large polysaccharides which, in turn, can by hydrolyzed by diastatic enzymes while the proteolytic enzymes attack the protein by hydrolysis and otherwise are effective against those compounds possessing nitrogen atoms. For instance, the chitin is more readily susceptible to the action of the diastatic enzymes by reason of the fact that the nitrogen atoms forming a part of the chitin are hydrolyzed.

As can be seen, the action of the enzymes forming the synergistic combination discovery, in accordance with the present invention, are complex in their actions and rely upon the actions of the enzymes to achieve the final breakdown of the connecting tissues of the shells. The cellulase enzymes, while being optional, nevertheless from an important part of one facet of the present invention.

The proteolytic enzymes which form a part of the present invention are those that may be of plant, animal or micro-organism sources, examples of those proteolytic enzymes useful for the purposes of this invention are papain, ficin, bromelin which find their source in plants. Other proteolytic enzymes which are obtainable from animals include the enzymes tripsin, chymotrylsin and pancreatin. Other enzymes obtainable from molds include *Aspergillus wentii* and *Aspergillus oryzae*. Bacterially derived enzymes obtained from culturing bacteria organisms, such as *Bacillus mesenteroides*, *Bacterium subtilis* and *Clostridium welchii*. The amount of the proteolytic enzymes to be used in the aqueous bath ranges from 60–96% by weight of all enzymes in the solution.

Diastatic enzymes useful in accordance with the present invention convert polysaccharides such as chitin or starch, into less complex compounds such as dextrin, dextrose or maltose. Typical of such diastatic enzymes are both alpha and beta amylose and amylo-glucoside. The diastatic enzymes should be present in the bath in amount varying between 4–40% by weight of all enzymes present.

The cellulase enzymes converting cellulose and cellulase derivatives to lower molecular saccharides are present in seeds, bacteria and molds. The cellulase enzymes, though optional, may be present in an amount between 1–20% by weight of the total enzymes present.

To form the treating bath, the mixture of enzymes is dissolved in water in an amount to produce a concentration of enzymes between .01 to 5%.

It has been determined that the bath for immersing the marine creatures generally should be at a temperature above approximately 90° F. and may be at a temperature as high as 175° F. Usually 135° F. is preferred maximum. The time for immersion may vary and, like the temperature, is not critical to the invention but, generally, may range between 45 and 300 minutes while 45–200 is preferable. The pH of the enzymatic treating bath is not critical and may range between pH 2.8–8.5 which may be maintained, if necessary, by conventional acids such as citric or alkalis and/or by use of salts which produce a buffering action such as sodium-bicarbonate.

In treating the marine creatures, such as oysters, clams, scallops, shrimp, crayfish, conch, etc. an optional initial bath at a temperature between 110–175° is desirable but not necessary for a time between 10 and 150 seconds to raise the temperature of the marine creatures to approximately the treating bath temperature.

The marine creatures may then be deposited in a container, preferably constructed of a non-reactive material such as stainless steel, which has provision for enclosing the contents. The sea food is covered with the aqueous solution of the enzymes which may be circulated through the sea food in an amount that may vary between equal parts of the treating solution per part of the edible final product up to 20 or greater parts by weight solution per part edible product. Any amount greater than 20:1 is not warranted for economic reasons.

After the enzymes have been in contact with the marine creatures for a time between 45 minutes to 200 minutes, at a temperature above 90° to below 175° F., it will be found that, in the case of claims or other shellfish, that the hinge is weakened and partially dissolved along with the thin layer of connective tissues between the shell and the adductor muscles. It is believed that proteolytic enzymes are active for instance in hydrolyzing the collagen present in these connective tissues to substantially loosen the edible portion of the cam which includes the tongue, gill and the adductor muscle so that it may be subsequently removed from the shell.

In the instance that shrimp or other crustacea are subjected to the enzymatic treatment of the present invention, there is a selective action of the proteolytic enzymes upon the chitin and connective tissue by which the edible flesh is attached to the chitin containing shell. In this instance, the proteolytic enzymes also attack the protein, as well as the nitrogen atoms contained in the chitin molecule to enhance synergistically the action of the diastatic enzymes in their attack upon the polysaccharide chitin. At the same time, if the optional cellulase is included in the enzymatic treating bath, the cellulose contained in the shell is degradated and hydrolyzed to lower molecular weight saccharides thereby effecting along with the proteolytic and diastatic engymes a complete collapse and at least a partial distintegration of the shell.

It has been found that the action of the enzymatic bath of the present invention may be even further enhanced through an optional vacuum treatment. If, after the creatures have been immersed in the enzymatic treating bath, a vacuum is applied during the immersion period for up to about half the time the marine creatures are immersed in the treating bath, that the length of time necessary to effect the desirable action of the enzymes is substantially reduced. Usually, a vacuum applied for 20 to 300 minutes, or preferably 20 to 200 minutes, from 20 to 28 inches of mercury is effective in achieving the desired effect. It is believed that the vacuum withdraws the gaseous matter within the marine creatures to effect more promptly the intimate contact between the enzyme solution and the connective tissues.

Of course, the marine creatures need not be batch treated but can be carried continuously on a slow moving conveyor from the enzyme solution. Even in the event the vacuum is to be used, a convention air lock will prevent the vacuum loss during the enzymatic treatment in accordance with the present invention.

The marine creatures, whether shellfish or crustacea, after being removed from the enzymatic bath upon the completion of sufficient hydrolysis of the selected tissue being treated, are found to exhibit the edible flesh loosely positioned within the shells in the case of shellfish and loosely covered by partially distintegrated shell covering when crustacea are being treated and there need only be a washing action spraying with jets of water or air or a combination of water and air to flush the edible tissue from the shells.

In practice, the flesh from the shellfish is retained on rods so spaced that the flesh passes through the rods while the shells are retained and discharged in a waste conveyor, whereas the flesh of the crustacea is retained on the rods while the disintegrated shell passes through the rods to a waste system. In the practice of the present invention, the spraying with fluid jets does not require, in any way, the personal attention of laborers and there is no possibility that the shells will be crushed, broken or splintered so that the flesh would be contaminated with imbedded parts of the shells.

It is one of the purposes of the present invention to assure that the shells of the shellfish are left as integral halves so as to minimize the possibility of splintering or breaking with the commensurate contamination of the flesh. There is also no need for mechanical abrasion or rolling action to remove the flesh from the shells since the connective tissue, in the case of marine creatures, is well exposed to the action of the enzymatic treatment making it not only unnecesary but undesirable to use mechanical force to abrade or rub the flesh from the shell.

After the fluid spray to separate the edible tissue from the shells, the edible portion may be further washed under action of additional jets of water or air or a combination of both to rid the flesh of any foreign materials such as sand or residual enzyme solution that may be secured to the flesh. The flesh may be deposited by gravity on to the rubber conveyor belt for a final inspection to remove any foreign material that may have escaped the fluid jet action. The marine creature may then be processed in the usual manner, either by canning or freezing. The clean shells of the shellfish which have the flesh or connective tissue completely removed do not attain the objectionable odor of shells left over from a manual shucking procedure and, therefore, do not present a health or odor problem. They may be stored and/or discarded at will.

EXAMPLE 1

5 pounds of frozen, headed, "unpeeled" shrimp were thawed in tap water at 58° F. The thawed shrimp were immersed in a solution comprising:

2 gallons water
7.6 grams proteolytic enzyme ficin
15.2 grams diastatic enzymes beta amylose
7 grams of sodium-bicarbonate the pH of the solution was 7.8 and the temperature was 125° F.

The shrimp were added to a stainless steel vessel equipped with a discharge tube at the bottom to which was attached a stainless steel pump designed to introduce the added enzyme solution according to the present invention in the top and removed from the bottom to provide circulation of the solution. The vessel containing the shrimp and solution was enclosed in a thermostatically controlled heating oven which maintained the temperature of the solution at 125° F. A vacuum equivalent to 25″ of mercury was applied to the oven and maintained at this degree of evacuation for approximately 30 minutes to displace air or gases in the gut cavity of the shrimp and other tissues with the warm enzyme solution. The vacuum was broken gradually by allowing air to enter the oven through a port regulated by a valve so that, at the end of 120 minutes, normal atmospheric pressure was re-established. The shrimp were then drained of the enzyme solution and placed in a wire mesh container and jets of water and air, under pressure, were directed against the shrimp. The shells were blown through the wire mesh leaving the whole shrimp tails free of chitinized shell and having the gut "vein" removed. A final rinse was applied to the shrimp before being emptied on a movable conveyor for inspection. The drained, deveined, peeled shrimp were weighed and the weight was 3 lbs. 15 ozs. Samples of the treated shrimp were compared with manually peeled and deveined shrimp by applying a commercial batter and breaded material to both and frying in deep fat at 350° F. The color, flavor and odor of both treated and conventional shrimp were judged to be identical by a trained taste panel.

EXAMPLE 2

90 lbs. of live clams were placed in a tank equipped with a flight conveyor which transported the clams through warm water (165° F.) in 55 seconds. The partially anesthetized clams were collected in a stainless steel jacketed kettle. The clams were covered with a solution composed as follows:

15 gallons water
114.0 grams (0.25 lbs.) proteolytic enzyme solution of ficin
28.0 grams (0.062 lbs.) diastatic enzyme alpha amylose
12.5 grams (0.027 lbs.) cellulolytic ezyme system of fungal derivation—cellulase
85.0 grams citric acid Temperature of the solution surrounding the clams was maintained at 130° F. ±2° F. by circulating thermostatically controlled warm water through the outer jacket of the kettle. The solution was gently circulated around and through the clams by a stainless steel pump which withdrew the liquid from the bottom of the kettle and discharged it through a stainless steel pipe back onto the top surface of the vessel. After 165 minutes the solution was drained from the kettle and the clams were emptied by gravity into a rod reel washer. The clams were conveyed under sprays of water which washed the contents of the "belly" free from the remainder of the clam flesh as the flesh was floated and washed free of the shells. The flesh passed through the rods of the washer into a collection basin below the washer and by gravity, over a dewatering grid onto a conveyor belt for final inspection. The shells, free of clam flesh, were conveyed to the end of the washer and discharged onto a disposal conveyor. The drained clam flesh was weighed and the weight was 13 pounds. This weight is equivalent to the average expected by conventional shucking. The flesh was minced and canned in the conventional manner followed by thermal processing. Comparison was made of the canned product with that from clams shucked manually by experts in this field. The comparison showed that the two products were identical in color, flavor and aroma.

One of the further advantages of the present invention is that many shells contain or have attached to them in the interior as well as the exterior, both animal and vegetable growths which, in the past, may have required special treatments or else resulted in the contamination of the final product. Such animal or vegetable growths are not of concern in the practice of the present invention since such growths are at least partially, if not totally, hydrolyzed and washed from the edible tissue.

One of the relatively important advantages of the present invention is not only that the edible portion of the marine creature is removed from its shell but also that, in the instance of the clam, the belly is selectively hydrolyzed and washed away as well as the vein or lower gut of the shrimp thereby making it unnecessary for the vein to be removed by manual labor as is presently required.

From the foregoing detailed description, it will be evident that there are a number of changes, adaptations and modifications of the present invention which come within the province of those skilled in the art. However, it is intended that all such variations, not departing from the spirit of the invention, be considered as within the scope thereof as limited solely by the appended claims.

I claim:

1. A method for treating marine creatures possessing a shell to loosen edible tissue held by connective tissue within said shell comprising:
   immersing said creatures in an aqueous bath having a concentration of enzymes of .01–5% by weight, said enzymes being a synergistic mixture composed of 60–96% by weight proteolytic and 4–40% diastatic enzymes at a temperature and for a time sufficient to dissolve at least partially said connective tissue to facilitate removal of said tissue from said shell.

2. The method of claim 1 wherein said temperature is 90° F.–175° F. and said time is from 45 to 300 minutes.

3. The method of claim 1 wherein a vacuum is applied to said marine creatures prior to removal from said bath.

4. The method of claim 1 wherein 1–20% cellulase enzymes by weight are added to said bath.

5. The method of claim 1 including removing said creatures from said bath and spraying said creatures with water to remove said edible tissue from said shells.

6. The method of claim 1 wherein said bath is at least equal in weight to the weight of the edible tissue.

7. The method of claim 1 including reacting said diastatic enzymes with the chitin of said shells.

8. The method of claim 1 including adding 1–20% cellulytic enzymes by weight to said bath, applying a vacuum to said marine creatures prior to removal from said bath, maintaining said bath temperature from 90° F.–175° F. and the time of immersion between 45–300 minutes.

9. The method of claim 8, including removing said creatures from said bath and spraying said creatures with water to remove said edible tissue from said shells.

10. The method of claim 1 wherein the collagen of said connective tissue is softened by hydrolysis to permit removal of said tissue from said shell.

11. The method of claim 1 wherein the marine creatures are shrimp.

12. The method of claim 11 wherein the proteolytic enzyme is ficin and the diastatic enzyme is beta amylose.

13. The method of claim 1 wherein the marine creatures are clams.

References Cited

UNITED STATES PATENTS 3,098,014  7/1963  Denton et al. _____ 195—2

LIONEL M. SHAPIRO, Primary Examiner

U.S. Cl. X.R.

17—48; 99—111